US008731816B2

(12) United States Patent
Dintzer et al.

(10) Patent No.: US 8,731,816 B2
(45) Date of Patent: May 20, 2014

(54) METHOD FOR CLASSIFYING AN OBJECT AS AN OBSTACLE

(75) Inventors: Philippe Dintzer, Lindau (DE); Tobias Stephan, Wasserburg (DE); Martin Randler, Immenstaad (DE); Nele Hanel, Bodolz (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 195 days.

(21) Appl. No.: 13/258,694

(22) PCT Filed: Jan. 14, 2010

(86) PCT No.: PCT/DE2010/000028
§ 371 (c)(1),
(2), (4) Date: Sep. 28, 2011

(87) PCT Pub. No.: WO2010/121584
PCT Pub. Date: Oct. 28, 2010

(65) Prior Publication Data
US 2012/0130628 A1 May 24, 2012

(30) Foreign Application Priority Data

Apr. 22, 2009 (DE) .......................... 10 2009 018 453

(51) Int. Cl.
*G06F 17/10* (2006.01)
*G06G 7/78* (2006.01)
*G08G 1/16* (2006.01)

(52) U.S. Cl.
USPC ........................................................ 701/301

(58) Field of Classification Search
USPC ........................................................ 701/301
See application file for complete search history.

(56) References Cited

U.S. PATENT DOCUMENTS

| 6,018,308 | A | * | 1/2000 | Shirai | ............................ 342/70 |
| 6,377,205 | B1 | | 4/2002 | Eckersten et al. | |
| 6,404,328 | B1 | | 6/2002 | Alland et al. | |

(Continued)

FOREIGN PATENT DOCUMENTS

| DE | 198 32 790 | 1/1999 |
| DE | 101 52 078 | 7/2002 |

(Continued)

OTHER PUBLICATIONS

PCT International Search Report of the International Searching Authority for International Application PCT/DE2010/000028, mailed Sep. 1, 2010, 5 pages, European Patent Office, HV Rijswijk, Netherlands.

(Continued)

*Primary Examiner* — Thomas Tarcza
*Assistant Examiner* — Harry Oh
(74) *Attorney, Agent, or Firm* — W. F. Fasse

(57) ABSTRACT

A method for classifying objects into obstacles and non-obstacles for a vehicle is described. The vehicle comprises a sensor for covering the surroundings that detects stationary and moving objects in a scene in front of a vehicle. Where required, the path of the motion of the objects is tracked. The method provides one or several observers, wherein one observer classifies an object according to predetermined features and contributes to an overall classification result when there are several observers. An observer detects the path of the motion of vehicles in the surroundings of at least one stationary object and classifies the stationary object in dependence thereon.

11 Claims, 1 Drawing Sheet

(56) References Cited

U.S. PATENT DOCUMENTS

| | | |
|---|---|---|
| 7,840,354 B2 | 11/2010 | Knoop et al. |
| 2004/0030497 A1* | 2/2004 | Knoop et al. .............. 701/301 |
| 2008/0042894 A1* | 2/2008 | Kikuchi .................... 342/71 |
| 2008/0188996 A1 | 8/2008 | Lucas et al. |
| 2008/0319670 A1* | 12/2008 | Yopp et al. ................ 701/301 |
| 2010/0097200 A1 | 4/2010 | Hilsebecher et al. |
| 2011/0098892 A1* | 4/2011 | Lundmark et al. ........... 701/45 |

FOREIGN PATENT DOCUMENTS

| | | |
|---|---|---|
| DE | 698 29 777 | 3/2006 |
| DE | 102005024716 | 12/2006 |
| DE | 102007036175 | 2/2008 |
| WO | WO 03/007271 | 1/2003 |
| WO | WO 2006/092361 | 9/2006 |

OTHER PUBLICATIONS

PCT International Preliminary Report on Patentability including English Translation of PCT Written Opinion of the International Searching Authority for International Application PCT/DE2010/000028, mailed Nov. 3, 2011, 12 pages, International Bureau of WIPO, Geneva, Switzerland.

German Search Report for German Application No. 10 2009 018 453.8, dated Aug. 3, 2009, 4 pages, with English translation, 4 pages, Muenchen, Germany.

* cited by examiner

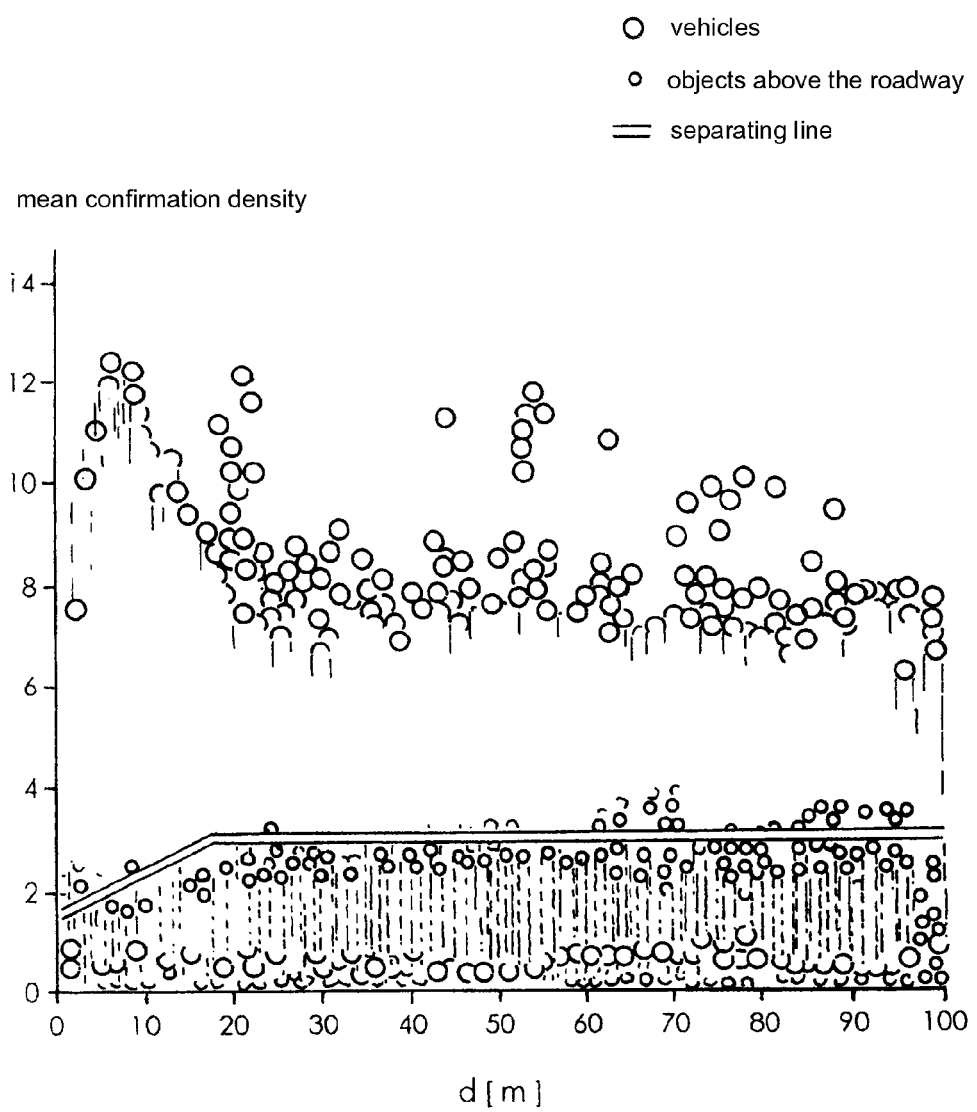

METHOD FOR CLASSIFYING AN OBJECT AS AN OBSTACLE

FIELD OF THE INVENTION

The invention relates to a method for object classification for the use in a vehicle with a driver assistance system.

BACKGROUND INFORMATION

Motor vehicles are being increasingly equipped with driver assistance systems that cover the surroundings by means of sensor systems, detect traffic situations and support the driver, e.g., by a braking intervention or a steering intervention or by outputting a warning. The correct classification of surrounding objects for ensuring that the driver assistance system only reacts to real obstacles is particularly important.

SUMMARY OF THE INVENTION

The object of the invention is to describe a method for classifying objects into obstacles and non-obstacles.

A method for classifying objects into obstacles and non-obstacles for a vehicle with a sensor for covering the surroundings is claimed, wherein said sensor for covering the surroundings detects stationary and moving objects in a scene in front of a vehicle. A sensor for covering the surroundings is, e.g., a radar sensor or a lidar sensor or a camera sensor. The method for the automatic classification of objects from sensor data is preferably provided in an evaluation unit in the vehicle. Since an object staying in the covered region for a corresponding period of time is detected several times, the path of the motion of an object is recorded where required (the object is tracked). The method provides at least one observer. In an advantageous realization, more than one observer contribute to the overall classification result. One observer classifies an object according to predetermined features, thus confirming the classification result of other observers where required.

BRIEF DESCRIPTION OF THE DRAWING

The single drawing FIGURE shows a diagram of confirmation density of an object being monitored over distance, as used in an embodiment of an inventive method.

DETAILED DESCRIPTION OF EXAMPLE EMBODIMENTS OF THE INVENTION

In an advantageous realization of the invention, an observer detects the path of the motion of an object that has been identified as a vehicle, in particular in the surroundings of at least one stationary object. In dependence thereon, the stationary object is classified. If there is, e.g., a stationary object on the path of a vehicle driving ahead and if the vehicle still passes this object, it must be possible to drive over or under this object. In a further exemplary embodiment, the course of the velocity of a vehicle driving ahead is evaluated. An intensive slowing-down of the vehicle in the immediate surroundings of the object indicates that the object is an obstacle.

A further realization of the invention provides an observer that describes the distribution of a mean maximum confirmation density of an object in dependence on the longitudinal distance between the object and the sensor for covering the surroundings. For this purpose, the various reflections from an object are accumulated over time and incremented. Said accumulation is called "confirmation density" and stored in a tracker. In this way, said confirmation density is connected to the object position. The observer will be explained in greater detail on the basis of an exemplary embodiment and of FIG. 1. The sensor for covering the surroundings detects an object that is located in front of the sensor vehicle and transversely to the roadway and has a shape and a width that could correspond to a vehicle on the roadway (obstacle) or to a guide sign gantry (non-obstacle). The FIGURE shows the mean maximum confirmation density over the object distance for a guide sign gantry above the roadway and for a vehicle on the roadway. A distinct separating line is formed over the distance. Said separating line enables obstacles to be separated from non-obstacles. If the object is a vehicle (obstacle on the roadway), the confirmation density is comparatively high and increases when distance values are small. Conversely, if the object is a guide sign gantry (non-obstacle above the roadway), the mean maximum confirmation density is comparatively low and decreases when distance values are small. In a preferred realization of the invention, all accumulations belonging to an object are collected in one box on the basis of grid pattern recognition, whereafter the shape and the size of the box are analyzed. The values of the confirmation densities are analyzed within said box. For each line, the maximum confirmation density is searched for. After that, the mean of the found maxima is taken. In this way, the so-called mean maximum confirmation density is determined.

In an advantageous realization, one observer classifies an object on the basis of its shape, e.g., by means of a pattern recognition method. A stationary, laterally extended, coherent object extending beyond the roadside border lines can be classified as a potential bridge or guide sign gantry and thus as a non-obstacle. The feature mentioned last distinguishes a bridge from, e.g., the end of a traffic jam because the end of a traffic jam concentrates within the roadside border lines.

If a first observer indicates that it is possible to drive under the object and a second observer classifies the object as a bridge, the overall classification result is "non-obstacle".

A particular realization of the invention provides an observer that classifies a stationary object having a small dispersion or extension as a potential non-obstacle. For example, a coke can or a post has a small dispersion compared with a vehicle. It is possible to drive over a coke can, i.e., it is a non-obstacle, whereas a stationary vehicle represents an obstacle. In an advantageous realization of the invention, small objects that can be driven over are implicitly suppressed. For example, if the tracked area of an object is too small for indicating any similarity with a typical obstacle (e.g., a vehicle), the object is suppressed. The length/width ratio and/or the covered area are taken into consideration for suppression. If necessary, the distance between the object and the ego-vehicle is taken into consideration when evaluating the object area.

An advantageous realization of the invention provides a further observer that classifies stationary roadside border objects. Roadside border objects can be recognized, e.g., on the basis of their special shape (crash barriers) or their periodical appearance (traffic lines, reflectors). Only those objects which are located between the roadside border objects, i.e., on the roadway, are classified as obstacles.

The invention claimed is:
1. A method of classifying an object as an obstacle for a subject vehicle with a sensor for monitoring a surrounding environment of the subject vehicle, comprising
using the sensor, detecting stationary objects and moving objects in a scene in the surrounding environment in front of the subject vehicle, and when required tracking a respective path of motion of at least one of the moving objects, and using an observer arrangement that includes at least one observer, detecting a path of motion of at least one other vehicle approaching a first one of the stationary objects in the surrounding environment, and classifying the first one of the stationary objects as an obstacle or a non-obstacle for the subject vehicle dependent on the path of motion of the other vehicle.

2. The method according to claim 1, further comprising
using the sensor, determining roadside border lines, and
using the observer arrangement, classifying at least one of the stationary objects as an obstacle or a non-obstacle dependent on a shape of the respective stationary object, wherein particularly if the respective stationary object is a coherent object extending laterally beyond the roadside border lines then the respective stationary object is classified as a potential bridge and thus as a non-obstacle.

3. The method according to claim 1, further comprising,
using the observer arrangement, classifying at least one of the stationary objects as a non-obstacle if the respective stationary object has a significantly smaller dispersion or extension than a typical obstacle, particularly a vehicle.

4. The method according to claim 1, further comprising,
using the sensor, determining roadside border lines,
using the observer arrangement, classifying at least one of the stationary objects as a non-obstacle if the respective stationary object is located along one of the roadside border lines and is recognized as a roadway boundary object, and
using the observer arrangement, classifying as obstacles only respective ones of the objects that are located on a roadway between the roadside border lines.

5. The method according to claim 1, further comprising
determining a distribution of a mean maximum confirmation density of the objects relative to a longitudinal distance of the objects from the sensor, and
classifying at least one of the objects as an obstacle or as a non-obstacle dependent on the distribution of the mean maximum confirmation density of the respective object.

6. A method comprising the steps:
a) using a sensor arrangement including at least one sensor on a subject vehicle, detecting an object and a moving vehicle in an environment outside of said subject vehicle, and producing sensor data indicative of said object and said moving vehicle;
b) in an evaluation arrangement on said subject vehicle, evaluating said sensor data and thereby monitoring a motion characteristic of said moving vehicle in relation to at least one of a position and a path of said object, wherein said motion characteristic includes at least one of a motion path and a velocity progression of a motion of said moving vehicle; and
c) in said evaluation arrangement, classifying said object as an obstacle or a non-obstacle for the subject vehicle in response to and dependent on said motion characteristic of said moving vehicle.

7. The method according to claim 6, further comprising providing from said evaluation arrangement to a driver assistance system on said subject vehicle, information regarding whether said object was classified as said obstacle or as said non-obstacle, and adjusting an operation of said driver assistance system in response to and dependent on said information.

8. The method according to claim 6, wherein said object is a stationary object and said motion characteristic of said moving vehicle is monitored in relation to said position of said stationary object.

9. The method according to claim 6, wherein said object is a moving object and said motion characteristic of said moving vehicle is monitored in relation to said path of said moving object.

10. The method according to claim 6, wherein, if said evaluating and said monitoring in said step b) determine that said moving vehicle passes over or under said object, then said classifying in said step c) classifies said object as said non-obstacle.

11. The method according to claim 6, wherein, if said evaluating and said monitoring in said step b) determine that said motion path of said moving vehicle swerves around said position or said path of said object, or that said velocity progression of said moving vehicle slows down so that said moving vehicle avoids said position or said path of said object, then said classifying in said step c) classifies said object as said obstacle.

* * * * *